(12) United States Patent
Cannillo et al.

(10) Patent No.: US 12,538,047 B2
(45) Date of Patent: Jan. 27, 2026

(54) AMBIENT LIGHT SENSING WITH IMAGE SENSOR

(71) Applicant: Apple Inc., Cupertino, CA (US)

(72) Inventors: Francesco Cannillo, Munich (DE); Tibi Galambos, Binyamina (IL)

(73) Assignee: APPLE INC., Cupertino, CA (US)

( * ) Notice: Subject to any disclaimer, the term of this patent is extended or adjusted under 35 U.S.C. 154(b) by 166 days.

(21) Appl. No.: 18/243,516

(22) Filed: Sep. 7, 2023

(65) Prior Publication Data
US 2025/0088767 A1    Mar. 13, 2025

(51) Int. Cl.
| | | |
|---|---|---|
| H04N 25/709 | (2023.01) | |
| H04N 25/60 | (2023.01) | |
| H04N 25/766 | (2023.01) | |
| H04N 25/77 | (2023.01) | |
| H04N 25/78 | (2023.01) | |

(52) U.S. Cl.
CPC ........... *H04N 25/766* (2023.01); *H04N 25/60* (2023.01); *H04N 25/709* (2023.01); *H04N 25/77* (2023.01); *H04N 25/78* (2023.01)

(58) Field of Classification Search
CPC .... H04N 25/766; H04N 25/60; H04N 25/709; H04N 25/77; H04N 25/78
See application file for complete search history.

(56) References Cited

U.S. PATENT DOCUMENTS

| | | |
|---|---|---|
| 6,975,008 B2 | 12/2005 | Cok |
| 7,683,305 B2 | 3/2010 | Solhusvik et al. |
| 8,723,095 B2 | 5/2014 | Solhusvik et al. |
| 8,735,795 B2 | 5/2014 | Qiao et al. |
| 8,872,093 B2 | 10/2014 | Lee et al. |
| 8,994,867 B2 | 3/2015 | Wang et al. |
| 9,952,092 B2 | 4/2018 | Costello et al. |
| 10,205,898 B2 | 2/2019 | McMahon et al. |

(Continued)

FOREIGN PATENT DOCUMENTS

| | | | |
|---|---|---|---|
| CN | 110135348 | 8/2019 | |
| CN | 113781969 A | * 12/2021 | ........... G09G 3/3406 |

OTHER PUBLICATIONS

Backlight adjusting method and device and electronic equipment (Year: 2021).*

*Primary Examiner* — Twyler L Haskins
*Assistant Examiner* — Surafel Yilmakassaye
(74) *Attorney, Agent, or Firm* — Brownstein Hyatt Farber Schreck, LLP

(57) ABSTRACT

Embodiments of the disclosure relate to a method of measuring ambient light using an image sensor. The method includes integrating a charge in each pixel in a set of pixels and reading out a respective voltage corresponding to a respective charge integrated by each pixel in the set of pixels. After reading out the respective voltage corresponding to the respective charge integrated by each pixel in the set of pixels, and before resetting each pixel in the set of pixels, the method includes electrically coupling a set of sense nodes of the set of pixels to redistribute charge among the sense nodes of the set of sense nodes of the set of pixels. The method further includes reading out a voltage corresponding to a redistributed charge from a pixel in the set of pixels and resetting each pixel in the set of pixels after reading out the voltage corresponding to the redistributed charge from the pixel in the set of pixels.

19 Claims, 13 Drawing Sheets

(56) References Cited

U.S. PATENT DOCUMENTS

| | | |
|---|---|---|
| 10,817,018 B1 | 10/2020 | Shao et al. |
| 10,868,966 B2 | 12/2020 | Hitomi |
| 11,086,450 B2 | 8/2021 | Ding et al. |
| 11,330,216 B2 | 5/2022 | Adusumalli et al. |
| 11,612,330 B2 | 3/2023 | Boukhayma et al. |
| 2005/0128327 A1* | 6/2005 | Bencuya ............... H10F 39/186 348/308 |
| 2015/0189198 A1* | 7/2015 | Park ...................... H04N 25/46 348/302 |
| 2019/0073937 A1* | 3/2019 | Cho ..................... G09G 3/2014 |
| 2022/0155143 A1 | 5/2022 | Moeneclaey |

* cited by examiner

AMBIENT LIGHT SENSING WITH IMAGE SENSOR

FIELD

The described embodiments generally relate to image sensors or the sensing of electromagnetic radiation (e.g., light). More particularly, the described embodiments relate to sensing ambient light using an image sensor.

BACKGROUND

Devices such as smartphones, tablet computers, digital cameras, and robotic and vehicle navigation systems often include image sensors. One common type of image sensor is the complementary metal oxide-semiconductor (CMOS) image sensor. In a CMOS image sensor, each pixel may include a photodetector, a number of transistors, and a sense node. Each pixel, when exposed to light, accumulates electrical charge in proportion to the number of photons incident on the photodetector. This electrical charge frequently needs to be transferred between a number of different nodes, including to the sense node.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

Some embodiments of this disclosure are directed to an image sensor having a reset line, a set of pixels, and a switch operable to couple or decouple the reset line to a source of a reset voltage. The set of pixels may include a first pixel and a second pixel. Each of the first pixel and the second pixel may separately include a sense node, a photodetector electrically coupled to the sense node, a readout circuit electrically coupled to the sense node, and a reset transistor operable to couple or decouple the sense node to the reset line.

Some embodiments of this disclosure are directed to an image sensor having a set of pixels and a control circuit. The set of pixels may include a first pixel and a second pixel. Each of the first pixel and the second pixel may separately include a sense node, a charge integration circuit electrically coupled to the sense node, a readout circuit electrically coupled to the sense node, and a reset circuit electrically coupled to the sense node. The control circuit may be coupled to the reset circuits of the first pixel and the second pixel. The control circuit may be operable in a first mode, a second mode, and a third mode. In the first mode, the control circuit may cause the sense nodes of the first pixel and the second pixel to be electrically coupled to a reset line through the reset circuits of the first pixel and the second pixel, while the reset line is electrically isolated from the reset voltage. In the second mode, the control circuit may cause the sense nodes of the first pixel and the second pixel to be electrically isolated from the reset line. The electrical isolation may be provided at least in part by the reset circuits of the first pixel and the second pixel. In the third mode, the control circuit may cause the reset voltage to be supplied to the sense nodes of the first pixel and the second pixel. The reset voltage may be supplied through the reset line and the reset circuits of the first pixel and the second pixel.

Some embodiments of this disclosure are directed to a method of measuring ambient light using an image sensor. The method may include integrating a charge in each pixel in a set of pixels and reading out the charge integrated by each pixel in the set of pixels. After reading out the charge integrated by each pixel in the set of pixels, and before resetting each pixel in the set of pixels, the method may include electrically coupling the respective sense nodes of the set of pixels to redistribute charge within the set of pixels. The method may further include reading out a redistributed charge from a pixel in the set of pixels and resetting each pixel in the set of pixels after reading out the redistributed charge from the pixel in the set of pixels.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the described techniques, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure will be readily understood by the following detailed description in conjunction with the accompanying drawings, wherein like reference numerals designate like structural elements, and in which:

FIG. 6A shows an example portion of a CMOS image sensor that may be used for image acquisition and ambient light sensing, while

Figure 1A:
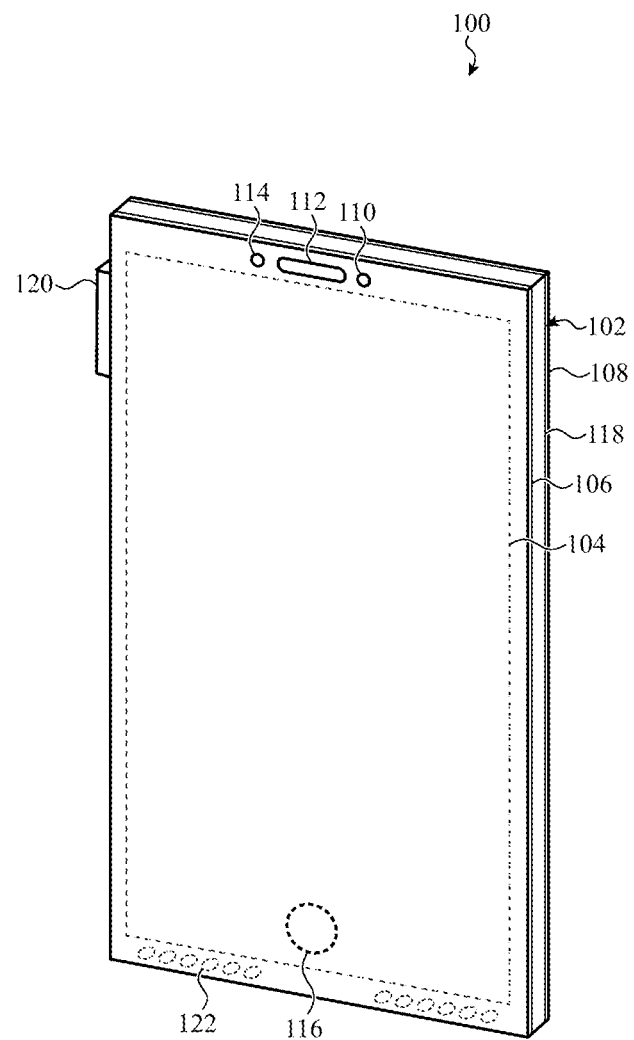
FIGS. 1A-1B show an isometric front view and an isometric rear view, respectively, of an example electronic device having an image sensor, according to certain aspects of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

The present disclosure is susceptible to various modifications and alternative forms, and some representative embodiments have been shown by way of example in the drawings and will be described in detail herein. It should be understood, however, that the described techniques are not intended to be limited to the particular forms disclosed. Rather, the disclosure is to cover all modifications, equivalents, and alternatives falling within the spirit and scope of the present description and appended claims.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively.

Additionally, directional terminology, such as "top", "bottom", "upper", "lower". "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. These words are intended to relate to the equivalent direction as depicted in a reference illustration; as understood contextually from the object(s) or element(s) being referenced, such as from a commonly used position for the object(s) or element(s); or as otherwise described herein. Further, it is noted that the term "signal" means a waveform (e.g., electrical, optical, magnetic, mechanical, or electromagnetic) capable of traveling through a medium such as DC, AC, sinusoidal-wave, triangular-wave, square-wave, vibration, and the like.

Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

In conventional pixel design, a sense node capacitance (e.g., a parasitic capacitance at the sense node of a pixel, introduced by design) provides the charge-to-voltage conversion of a pixel's integrated light. During an image capture frame, the pixel voltages of an array of pixels may be read out of the pixels, amplified, and digitized using an analog-to-digital converter. A reset transistor of a pixel, coupled between the pixel's sense node and a reset line, may be periodically closed to clear the charge and reset the voltage of the pixel's sense node capacitance to a fixed voltage. The voltage may be reset, for example, before enabling the collection of charge at the photodetector for a subsequent image frame, before reading a baseline voltage from the sense node, and/or before transferring charge from the pixel's photodetector to the pixel's sense node.

Embodiments of the disclosure are directed to an image sensor configured to sense ambient light, and to a related method of sensing ambient light using an image sensor. In some examples, a reset line may be coupled to some or all of the reset transistors for a row of pixels in an image sensor. A switching transistor may be connected in series in the reset line and may couple or decouple the reset line to a source of a reset voltage. When the reset transistors are closed while the switching transistor is closed, the sense nodes of the pixels in the row of pixels are reset to a default voltage.

However, as described herein, the operations of the reset phase for a row of pixels may be modified to include an ambient light sensing (ALS) phase after reading out the charges integrated by each pixel in the row of pixels, and before resetting each pixel for a next image frame. During this ALS phase, the switching transistor acts as an isolation switch and is opened to disconnect the reset line from the source of the reset voltage. The reset transistors for the row of pixels are then closed, such that respective sense nodes of the pixels in the row of pixels are electrically coupled. This enables charge redistribution among the sense nodes of the pixels in a row. Subsequently, at the end of charge redistribution, when the sense node capacitance in each pixel reflects the average charge of the pixels in the row, a readout of the voltage corresponding to the redistributed charge may be performed for any one of the pixels to determine an ambient light value. Finally, the switching transistor and the reset transistors may be closed, to reset the sense nodes of the pixels in the row of pixels to the default voltage. In some embodiments, a voltage corresponding to a redistributed charge may be read from a pixel in each row in a set of rows and the voltages may be averaged to determine an ALS value. In some embodiments, a voltage corresponding to a redistributed charge may be read from one or more pixels in each of a set of image frames and evaluated to identify a component or frequency of flicker in ambient light.

Structures and techniques described through the various embodiments of the disclosure can be used both in camera systems to determine/adjust exposure times for image frames (e.g., based on ambient lighting), and in display systems to determine/adjust display brightness (e.g., based on ambient lighting). Since the charge redistribution process described above ensures that the sense node in each pixel involved in a charge redistribution has the same charge (e.g., an equal or near equal charge), the corresponding average voltage readout can be performed from a single column of the row, i.e., a single pixel in the row, without having to read all of the pixels of all of the columns defined by the row. Further, flickering light conditions can be sensed by a readout performed for only some of the rows of pixels, rather than all of the rows of pixels. Accordingly, estimation of ambient light and/or flickering light conditions using the techniques described herein may require very little power or computational complexity.

Figure 1B:
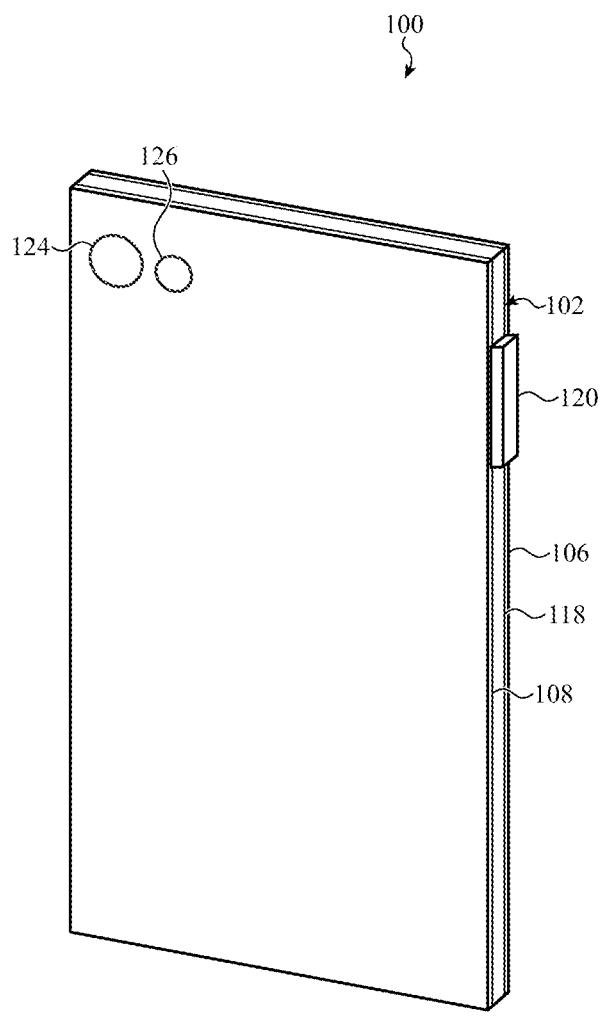

FIGS. 1A and 1B show an example of a device 100 that may include an image sensor. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example a mobile phone, tablet computer, portable computer, portable music player, wearable device (e.g., an electronic watch, health monitoring device, fitness tracking device, headset, or glasses), augmented reality (AR) device, virtual reality (VR) device, mixed reality (MR) device, gaming device, portable terminal, digital single-lens reflex (DSLR) camera, video camera, vehicle navigation system, robot navigation system, or other portable or mobile device. The device 100 could also be a device that is semi-permanently located (or installed) at a single location. FIG. 1A shows a front isometric view of the device 100, and FIG. 1B shows a rear isometric view of the device 100. The device 100 may include a housing 102 that at least partially surrounds a display 104. The housing 102 may include or support a front cover 106 or a rear cover 108. The front cover 106 may be positioned over the display 104 and provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements, and in some cases may be a light-emitting diode (LED) display, an organic LED (OLED) display, a liquid crystal display (LCD), an electroluminescent (EL) display, or another type of display. In some embodiments, the display 104 may include, or be associated with, one or more touch and/or force sensors that are configured to detect a touch and/or a force applied to a surface of the front cover 106.

The various components of the housing 102 may be formed from the same or different materials. For example, a sidewall 118 of the housing 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are conductive or non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume above, below, and/or to the side of the display 104 (and in some cases within the device stack). The force sensor (or force sensor system) may be triggered in response to the touch sensor detecting one or more touches on the front cover 106

(or a location or locations of one or more touches on the front cover 106) and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 100 may not include a separate touch sensor.

As shown primarily in FIG. 1A, the device 100 may include various other components. For example, the front of the device 100 may include one or more front-facing cameras 110 (including one or more image sensors), speakers 112, microphones, or other components 114 (e.g., audio, imaging, and/or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100. In some cases, the virtual button 116 and/or other features of the device 100 may be implemented using an under-display camera or image sensor. In some cases, an under-display camera or image sensor may occupy a larger area than the area in which the virtual button 116 is implemented (and in some cases an area consonant with or larger than the display 104).

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the rear surface of the device 100 may include a rear-facing camera 124 that includes one or more image sensors (see FIG. 1B). A flash or light source 126 may also be positioned on the rear of the device 100 (e.g., near the rear-facing camera). In some cases, the rear surface of the device 100 may include multiple rear-facing cameras.

As described herein, one or more of the cameras or image sensors of the device 100 may be constructed and/or operated to provide an ALS feature.

Figure 2:
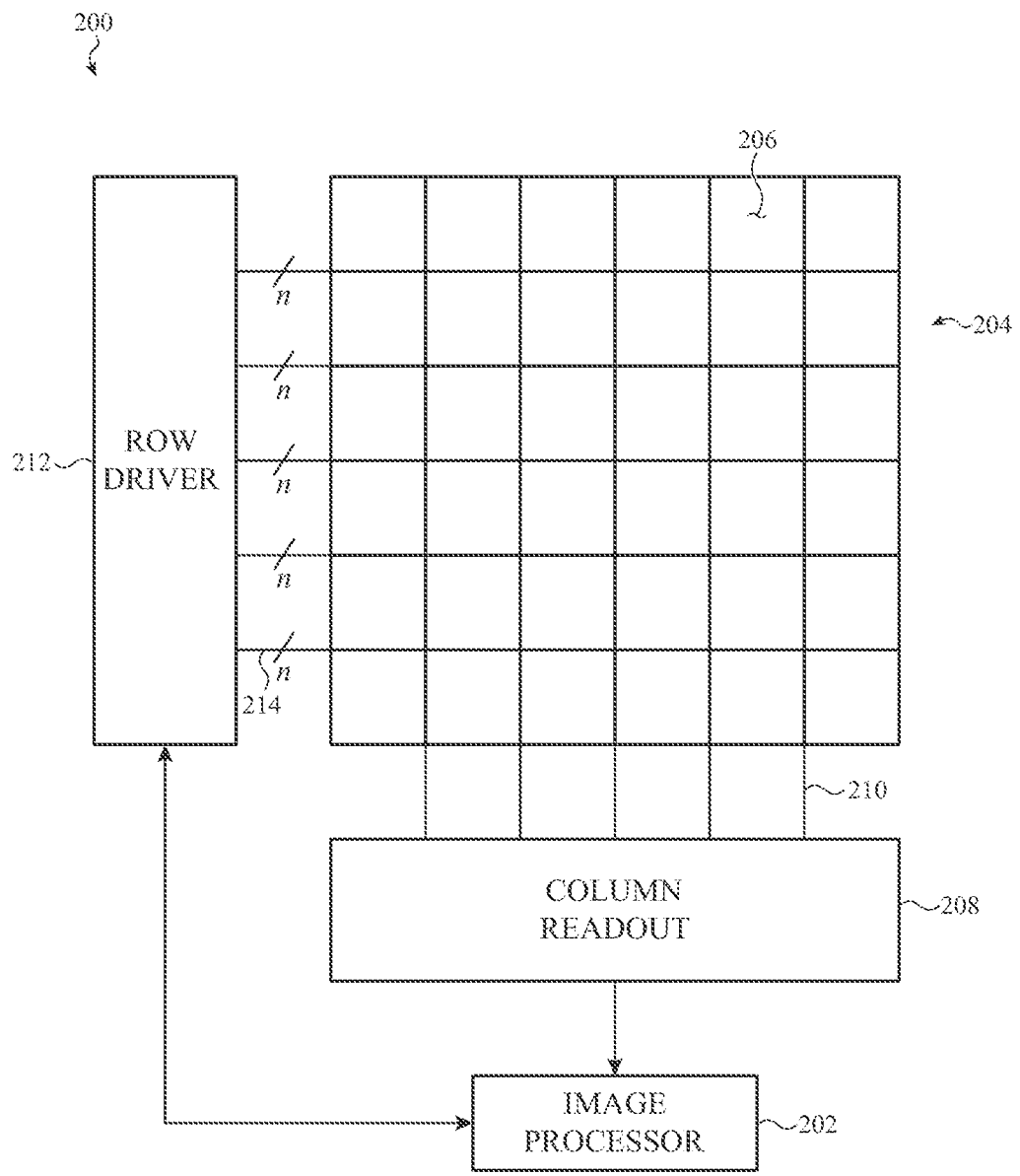
FIG. 2 shows an architectural view of one example of an image sensor, according to certain aspects of the present disclosure.

FIG. 2 shows an architectural view of one example of an image sensor 200, such as an image sensor associated with one of the cameras described with reference to FIGS. 1A and 1B. The image sensor 200 may include an image processor 202 and an imaging area 204 (or more generally, a sensing area). The imaging area 204 may be implemented as an array of pixels 206. The pixels 206 may be same-colored pixels (e.g., for a monochrome imaging area 204) or differently colored pixels (e.g., for a multi-color imaging area 204). In the illustrated embodiment, the pixels 206 are arranged in rows and columns. However, the pixels 206 may alternatively be arranged in any suitable configuration, such as, for example, a hexagonal configuration.

The imaging area 204 may be in communication with a column readout circuit 208 through one or more column output lines 210, and with a row driver circuit 212 through one or more control signal lines 214 (e.g., n≥1 control signal lines, including, for example, a reset (RST) signal line, a charge transfer (TX) signal line, and a row select (RS) signal line). The row driver circuit 212 may selectively control a particular pixel 206 or group of pixels, such as all of the pixels 206 in a certain row, and in some cases may control different pixels 206 or groups of pixels in different ways, so that the different pixels 206 or groups of pixels can perform different operations in parallel. The column readout circuit 208 may selectively receive the data output from a selected pixel 206 or group of pixels 206 (e.g., all of the pixels in a particular row).

The row driver circuit 212 and/or column readout circuit 208 may be in communication with an image processor 202. The image processor 202 may determine how to control the pixels 206; process data from the pixels 206; and receive control information from, or provide processed data to, another processor (e.g., a system processor) and/or other components of a device (e.g., other components of the device 100 described with reference to FIGS. 1A and 1B). The image processor 202 may also receive focus information (e.g., phase-detect auto-focus (PDAF) information) from some or all of the pixels 206 and perform a focusing operation for the image sensor 200.

In some embodiments, the image sensor 200 may be configured as a rolling shutter image sensor, in which different rows or columns of pixels 206 are sequentially enabled and read out. In other embodiments, the image sensor 200 may be configured as a global shutter image sensor, in which all of the pixels 206 are enabled at once, charges integrated by the pixels 206 are locally stored, and then the charges are read out by row or column.

Figure 3A:
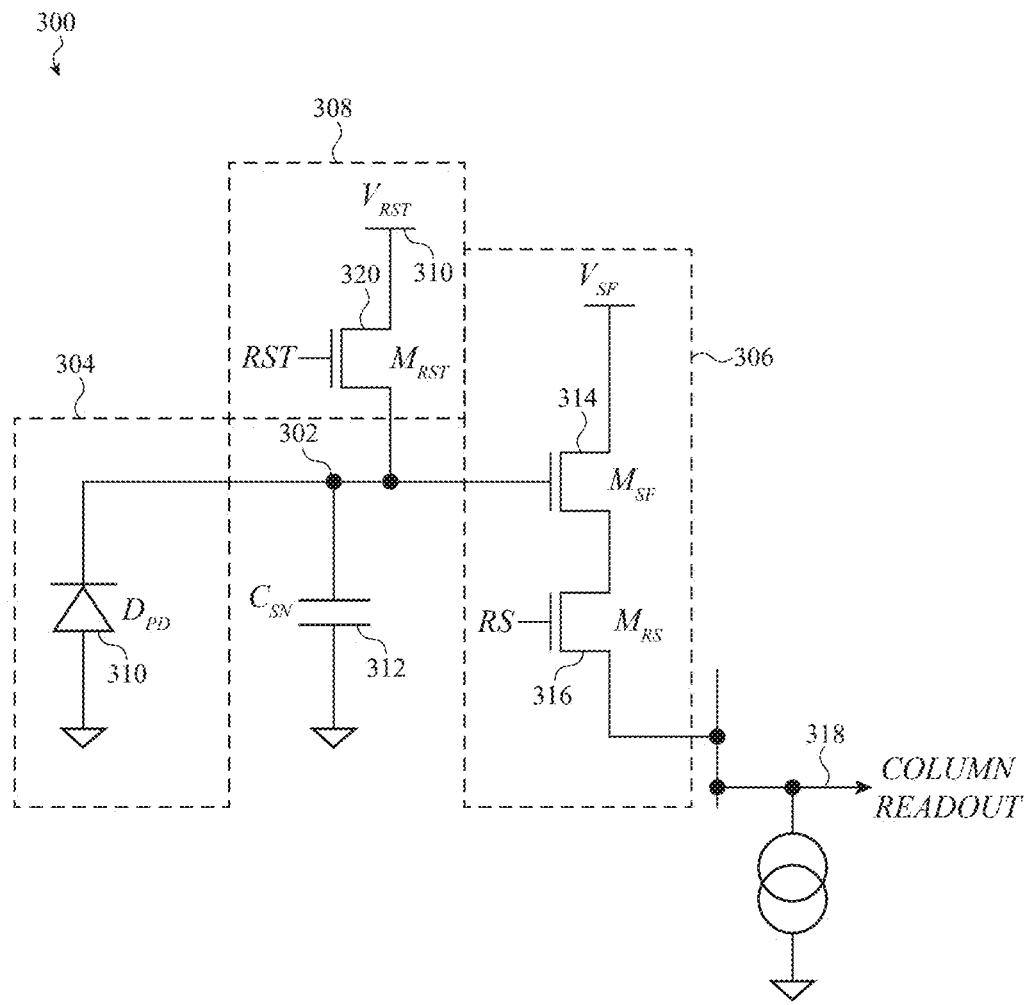
FIGS. 3A-3B show a schematic representation and corresponding operational timing diagram, respectively, of a representative three-transistor pixel in a CMOS image sensor, according to certain aspects of the present disclosure.
Figure 3B:
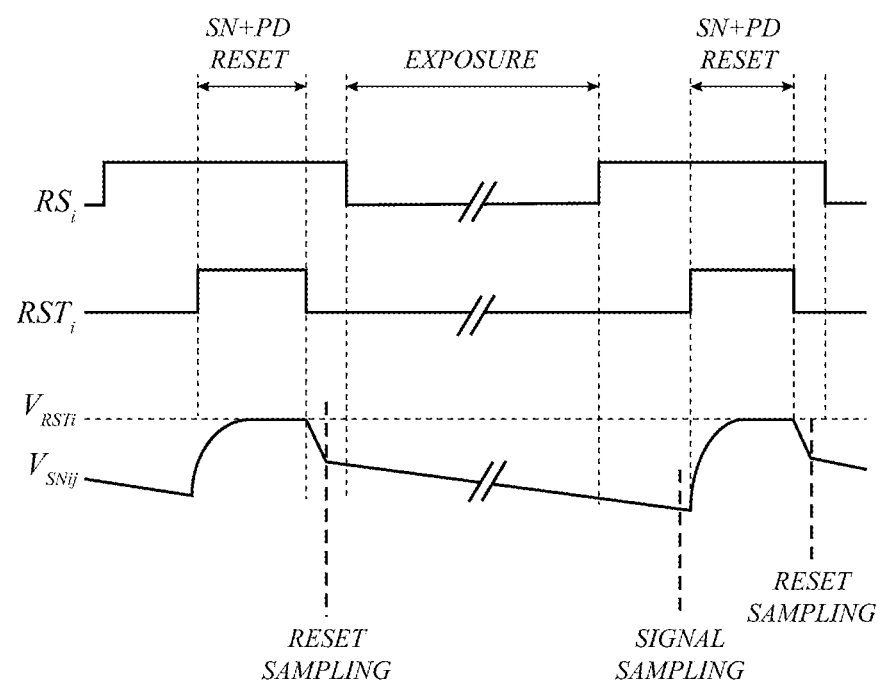

FIGS. 3A-3B show a schematic representation and corresponding operational timing diagram, respectively, of a representative three-transistor pixel 300 in a CMOS image sensor having a plurality of such pixels. As shown in FIG. 3A, the pixel 300 may include a sense node 302, a charge integration circuit 304 electrically coupled to the sense node 302, a readout circuit 306 electrically coupled to the sense node 302, and a reset circuit 308 electrically coupled to the sense node 302. The charge integration circuit 304 may include a photodetector 310 (e.g., a photodiode, $D_{PD}$). The photodetector 310 may have terminals that are electrically coupled between ground and the sense node 302. A sense node capacitance 312 (e.g., $C_{SN}$) may store a charge that is integrated by the photodetector 310 in response to light impinging on the photodetector 310. The sense node capacitance 312 performs the charge-to-voltage conversion for the pixel 300. The readout circuit 306 may include a source follower transistor ($M_{SF}$) 314 and a row select transistor ($M_{RS}$) 316, coupled in series via their source and drain terminals between a bias voltage ($V_{SF}$) and a column readout line 318. The gate of the source follower transistor 314 may be coupled to the sense node 302, and the gate of the row select transistor 316 may receive a row select (RS) signal. The voltage ($V_{SN}$) that is read out of the pixel 300 may be amplified by a column amplifier and digitized by a column analog-to-digital converter (not shown). The reset circuit 308 may include a reset transistor ($M_{RST}$) 320, coupled via its source and drain terminals between a reset line 322 and the sense node 302. The gate of the reset transistor 320 may receive a reset (RST) signal. The reset line 322 may be held at a reset voltage ($V_{RST}$). The sense node capacitance 312 may include a capacitance of the charge integration circuit 304 (e.g., a capacitance of the photodetector 310), a capacitance of the readout circuit 306 (e.g., a gate capacitance of the source follower transistor 314), and a capacitance of the reset circuit 308 (e.g., a diffusion capacitance of the reset transistor 320), in addition to any parasitic capacitance.

FIG. 3B shows a timing diagram for operation of the pixel 300 (and more particularly, for a pixel in a row i and a column j of an image sensor). During the "SN+PD Reset" phase, a control circuit (and in some cases a control circuit that is operated by a processor, which processor is executing a program that is stored in memory) may assert the RST signal and pull the sense node 302 to $V_{RST}$ (i.e., to $V_{SNij}=V_{RST}$), thereby resetting the pixel 300 for a new image frame. The control circuit may also assert the RS signal or maintain the RS signal in an asserted state. Following the "SN+PD Reset" phase and during a first part of a Double-Delta Sampling (DDS) Readout phase, the control circuit may de-assert the RST signal, thereby electrically isolating the sense node 302 from the reset line 322. Immediately after the RST signal is de-asserted, a baseline voltage of the sense node 302 (i.e., a reset value plus noise) may be read out to the column readout line 318 through the source follower transistor 314 and the row select transistor 316 (e.g., at the time of Reset Sampling). The reset sample contains noise components due to signal feed-thru and charge injection from the reset transistor 320 and thermal KTC noise. Following the first part of the DDS readout phase and during the "Exposure" phase, the control circuit may de-assert the RS signal, thereby electrically isolating the sense node 302 from the column readout line 318, and a charge may be integrated by the photodetector 310. The integrated charge may be stored on the sense node 302. Following the "Exposure" phase and during a second part of the DDS Readout phase, the control circuit may assert the RS signal and a voltage corresponding to the charge stored on the sense node 302 may be read out to the column readout line 318 through the source follower transistor 314 and the row select transistor 316 (e.g., at the time of Signal Sampling). The reset voltage read out during the first part of the DDS Readout phase may be subtracted from the voltage read out during the second part of the DDS Readout phase to obtain the voltage corresponding to the charge integrated by the photodetector 310. This compensates for all correlated noise components, such as signal feed-thru noise and charge injection nose. It does not compensate for thermal KTC noise, which is uncorrelated between the reset and signal sampling. After the second part of the DDS Readout phase, the control circuit may assert the RST signal, a new "SN+PD Reset" phase may begin, and the pixel 300 may be used to integrate a charge for a next image frame.

Although the pixel 300 is shown to be implemented with n-type metal oxide semiconductor (NMOS) transistors, the pixel 300 may be implemented with p-type metal oxide semiconductor (PMOS) transistors, a combination of NMOS and PMOS transistors, or other types of transistors. The pixel 300 may also be implemented with signals having the opposite polarity (or sense) from what is shown in FIG. 3B.

Figure 4A:
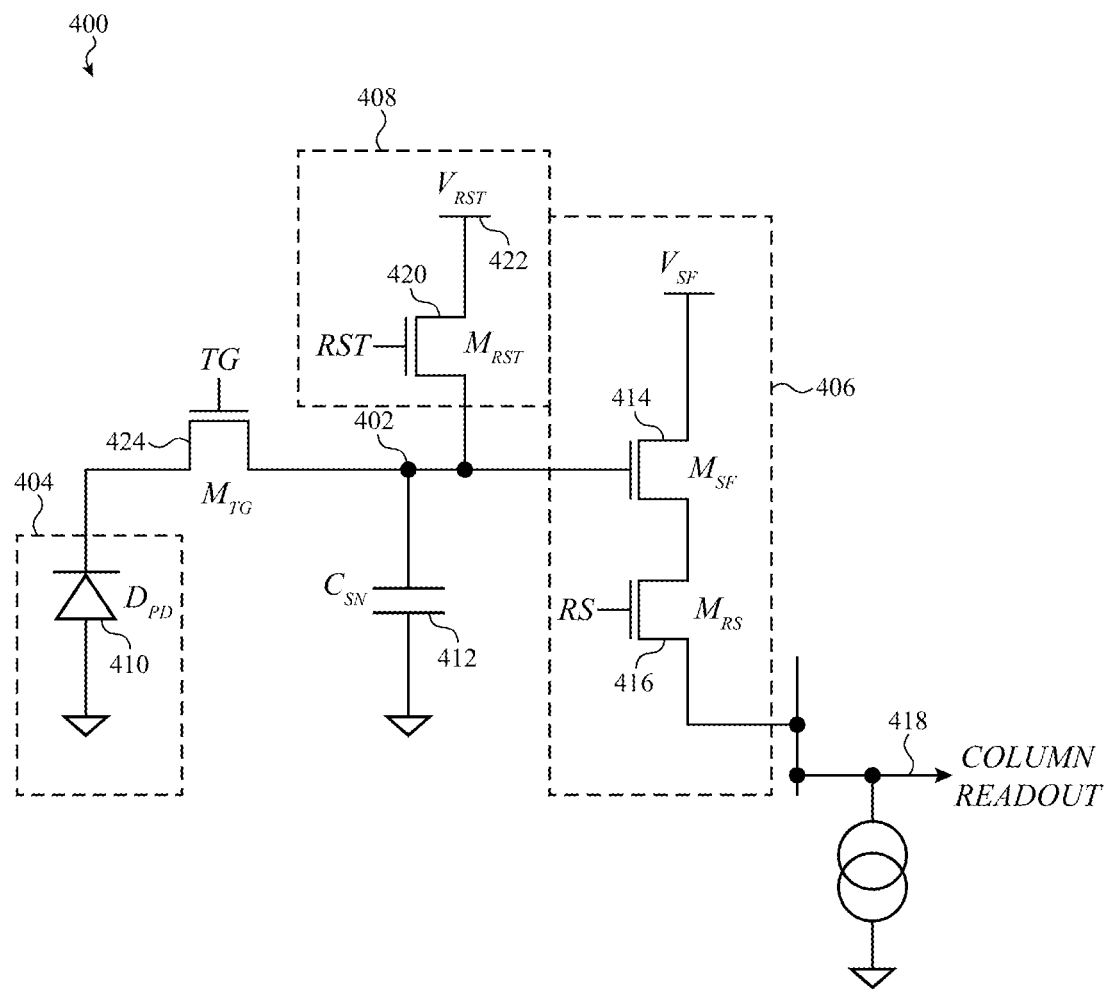
FIGS. 4A-4B show a schematic representation and corresponding operational timing diagram, respectively, of a representative four-transistor pixel in a CMOS image sensor, according to certain aspects of the present disclosure.
Figure 4B:
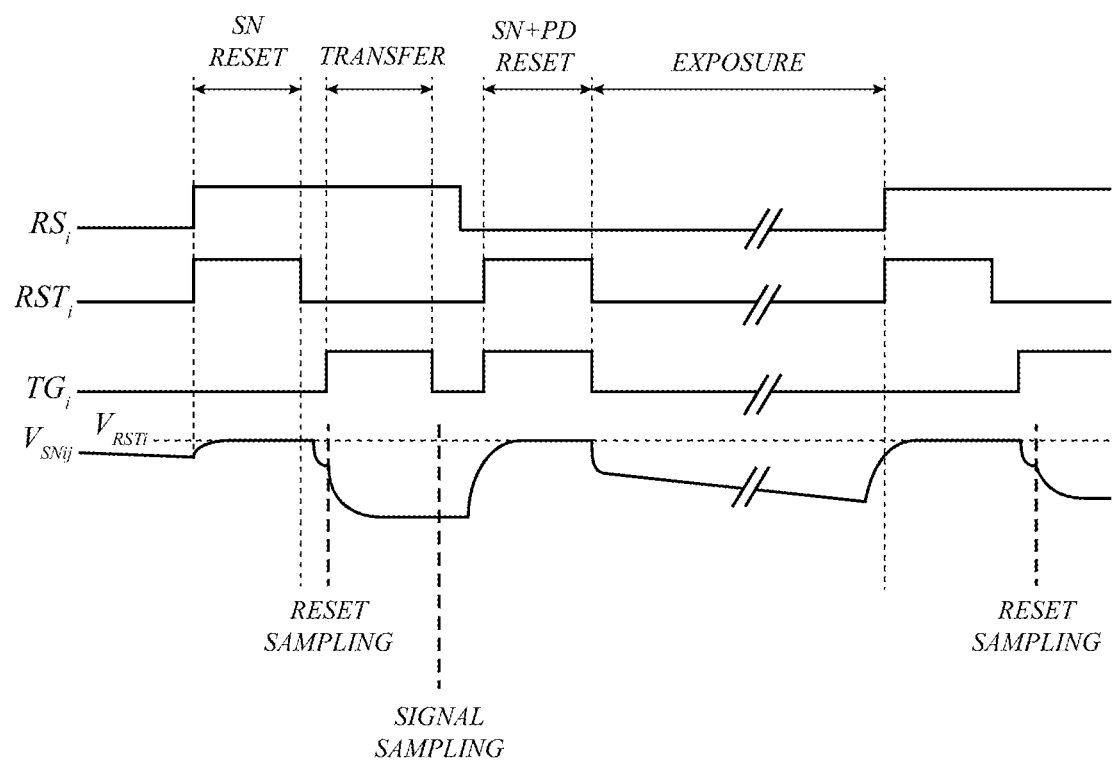

FIGS. 4A-4B show a schematic representation and corresponding operational timing diagram, respectively, of a representative four-transistor pixel 400 in a CMOS image sensor having a plurality of such pixels. As shown in FIG. 4A, the pixel 400 may include a sense node 402, a charge integration circuit 404 electrically coupled to the sense node 402, a readout circuit 406 electrically coupled to the sense node 402, and a reset circuit 408 electrically coupled to the sense node 402. The charge integration circuit 404 may include a photodetector 410 (e.g., a photodiode, $D_{PD}$). The photodetector 410 may have terminals that are electrically coupled between ground and a charge-transfer transistor ($M_{TG}$) 424. The charge-transfer transistor 424 may be electrically coupled between the photodetector 410 and the sense node 402 via its source and drain terminals. The gate of the charge-transfer transistor 424 may receive a transfer gate (TG) signal. In the example of FIG. 4A, the sense node 402 serves as a floating diffusion node that can be electrically isolated from the photodetector 410 by the charge-transfer transistor 424. A sense node capacitance 412 (e.g., $C_{SN}$) may store a charge that is integrated by the photodetector 410 in response to light impinging on the photodetector 410. The sense node capacitance 412 performs the charge-to-voltage conversion for the pixel 400. The readout circuit 406 may include a source follower transistor ($M_{SF}$) 414 and a row select transistor ($M_{RS}$) 416, coupled in series via their source and drain terminals between a bias voltage ($V_{SF}$) and a column readout line 418. The gate of the source follower transistor 414 may be coupled to the sense node 402, and the gate of the row select transistor 416 may receive a row select (RS) signal. The voltage ($V_{SN}$) that is read out of the pixel 400 may be amplified by a column amplifier and digitized by a column analog-to-digital converter (not shown). The reset circuit 408 may include a reset transistor ($M_{RST}$) 420, coupled via its source and drain terminals between a reset line 422 and the sense node 402. The gate of the reset transistor 420 may receive a reset (RST) signal. The reset line 422 may be held at a reset voltage ($V_{RST}$). The sense node capacitance 412 may include a diffusion capacitance of the charge-transfer transistor 424, a capacitance of the readout circuit 406 (e.g., a gate capacitance of the source follower transistor 414), and a capacitance of the reset circuit 408 (e.g., a diffusion capacitance of the reset transistor 420), in addition to any parasitic capacitance.

FIG. 4B shows a timing diagram for operation of the pixel 400 (and more particularly, for a pixel in a row i and a column j of an image sensor). During the "SN Reset" phase, a control circuit (and in some cases a control circuit that is operated by a processor, which processor is executing a program that is stored in memory) may assert the RST signal and pull the sense node 402 to $V_{RST}$ (i.e., to $V_{SNij}=V_{RST}$), thereby resetting the sense node 402. Following the "SN Reset" phase and during a first part of a Correlated Double Sampling (CDS) Readout phase, the control circuit may de-assert the RST signal, thereby electrically isolating the sense node 402 from the reset line 422. Immediately after the RST signal is de-asserted, a baseline voltage of the sense node 402 (i.e., a reset value plus noise) may be read out to the column readout line 418 through the source follower transistor 414 and the row select transistor 416 (e.g., at the time of Reset Sampling). The reset sample contains noise components due to signal feed-thru and charge injection from the reset transistor 420 and thermal KTC noise. Following the first part of the CDS readout phase and during the "Transfer" phase, the control circuit may assert the TG signal, thereby transferring a charge integrated by the photodetector 410 to the sense node 402. The transferred charge may be stored on the sense node 402. Following the "Transfer" phase, and during a second part of the CDS Readout phase, the control circuit may de-assert the TG signal, thereby electrically isolating the photodetector 410 from the sense node 402, and a voltage of the sense node 402 (i.e., a voltage corresponding to the charge integrated by the photodetector 410, plus noise) may be read out to the column readout line 418 through the source follower transistor 414 and the row select transistor 416 (e.g., at the time of Signal Sampling). The reset voltage read out during the first part of the CDS Readout phase may be subtracted from the voltage read out during the second part of the CDS Readout phase to obtain the voltage corresponding to the charge integrated by the photodetector 410. All noise components are compensated as they are all correlated in the reset and signal samples. The control circuit may assert the RS signal during each of the "SN Reset", "Transfer", and CDS Readout phases, and de-assert the RS signal before and after these phases. Following the second part of the CDS readout phase and during the "SN+PD Reset" phase, the control circuit may assert the RST and TG signals, pulling both the sense node 402 and the photodetector 410 to $V_{RST}$ (i.e., to $V_{SNij}=V_{RST}$) and resetting the pixel 400 for a new image frame. Following the "SN+PD Reset" phase and during the "Exposure" phase, the control circuit may de-assert the RST and TG signals, thereby electrically isolating the sense node 402 from the reset line 422 and the photodetector 410, and a charge may be integrated by the photodetector 410. Following the "Exposure" phase, the control circuit may assert the RS and RST signals, and a new "SN Reset" phase may begin.

Although the pixel 400 is shown to be implemented with NMOS transistors, the pixel 400 may be implemented with PMOS transistors, a combination of NMOS and PMOS transistors, or other types of transistors. The pixel 400 may also be implemented with signals having the opposite polarity (or sense) from what is shown in FIG. 4B.

Figure 5:
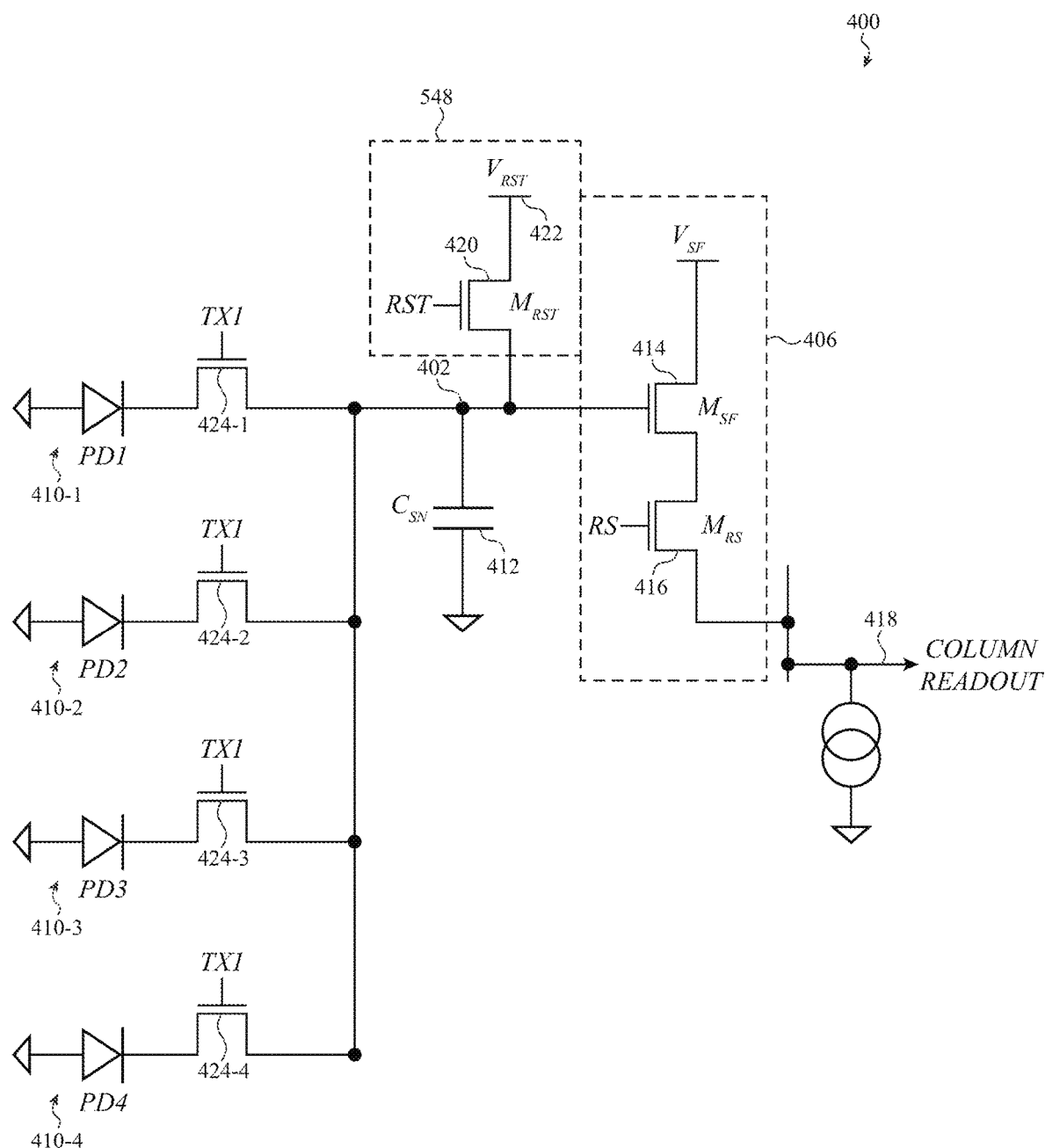
FIG. 5 shows a schematic representation of modified version of the pixel described with reference to FIGS. 4A and 4B, according to certain aspects of the present disclosure.

FIG. 5 shows a schematic representation of a modified version of the pixel described with reference to FIGS. 4A and 4B. The pixel 500 differs from the pixel described with reference to FIGS. 4A and 4B in that its charge integration circuit 404 includes multiple photodetectors 410 (e.g., a first photodetector 410-1, a second photodetector 410-2, a third photodetector 410-3, and a fourth photodetector 410-4), and each photodetector 410 may be coupled to a shared sense node 402 by a respective charge-transfer transistor 424 (e.g., a first charge-transfer transistor 424-1, a second charge-transfer transistor 424-2, a third charge-transfer transistor 424-3, or a fourth charge-transfer transistor 424-4). The gate of each charge-transfer transistor 424 may receive a respective transfer gate signal (e.g., TG1, TG2, TG3, or TG4). In operation, a charge may be integrated by each of the photodetectors 410 in parallel. The integrated charges may then be transferred to the sense node 402 in parallel, by the control circuit asserting each of TG1, TG2, TG3, and TG4 contemporaneously, during a single "Transfer" phase (i.e., a simultaneous transfer of charges to the sense node 402, such that the charges are summed (or binned) at the sense node 402). Alternatively, the pixel may be operated, during an image frame, with a single "SN+PD Reset" phase and "Exposure" phase, but with per-photodetector "SN Reset", "Transfer" and CDS Readout phases (i.e., to sequentially (separately) transfer and read out the voltages corresponding to the charges integrated by each of the photodetectors 410.

Figure 6A:
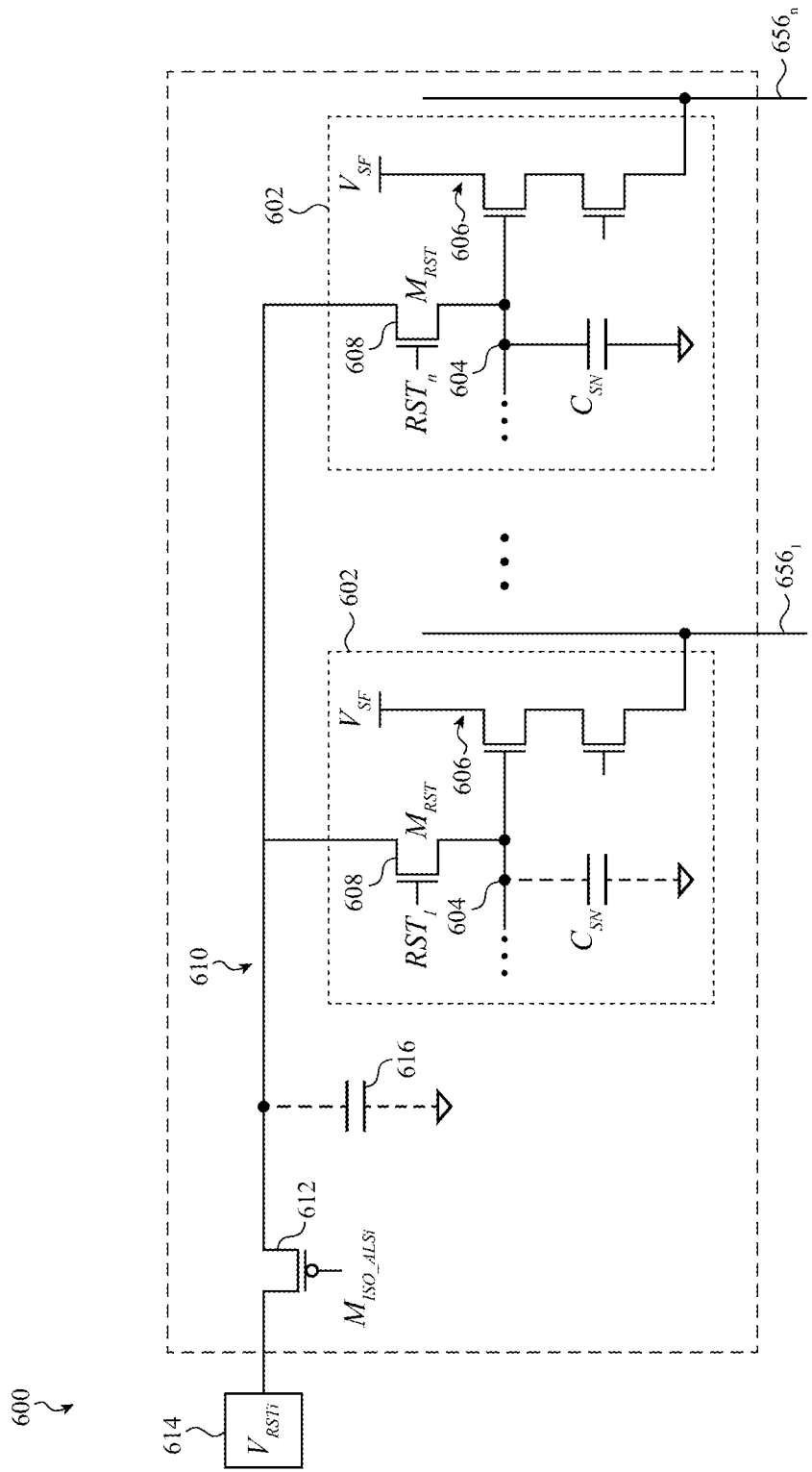

FIG. 6A shows an example portion of a CMOS image sensor 600 that may be used for image acquisition and ambient light sensing. The image sensor 600 may include a plurality of pixels 602. FIG. 6A shows a set of pixels $602_1, \ldots, 602_n$ arranged in one row of the image sensor 600. The image sensor 600 may, in some embodiments, include multiple rows of pixels, as described with reference to FIG. 2. The set of pixels includes at least a first pixel $602_1$ and a second pixel $602_n$. Each of the pixels $602_1, \ldots, 602_n$ may be a three-transistor pixel, such as the pixel 300 described with reference to FIG. 3A, a four-transistor pixel, such as the pixel 400 described with reference to FIG. 4A, a multiple photodetector pixel, such as the pixel 500 described with reference to FIG. 5, or another type of pixel having a reset circuit. Each of the pixels $602_1, \ldots, 602_n$ may include a respective sense node $604_1, \ldots, 604_n$, a respective charge integration circuit (not shown, but shown in other figures), a respective readout circuit $606_1, \ldots, 606_n$, and a respective reset circuit $608_1, \ldots, 608_n$, electrically coupled as described in FIG. 3A, 4A, or 5, or in other ways.

The image sensor 600 may further include a reset line 610 for providing a reset voltage to the pixels $602_1, \ldots, 602_n$, and a switch 612 (e.g., a switching transistor) that is electrically coupled in series with the reset line 610 and operable to couple (and decouple) the reset line 610 to a source 614 of a reset voltage ($V_{RST}$). The reset line 610 may be coupled or decoupled to the sense nodes $604_1, \ldots, 604_n$ of one or multiple pixels $602_1, \ldots, 602_n$ by the reset circuits $608_1, \ldots, 608_n$ of the pixels $602_1, \ldots, 602_n$ (e.g., by the reset transistors of the pixels $602_1, \ldots, 602_n$). In some embodiments, the switch 612 may include a metal oxide semiconductor (MOS) transistor ($M_{ISO\_ALS}$), coupled between the reset line 610 (and by means of the reset line 610, to the reset circuits $608_1, \ldots, 608_n$) and the source 614 of the reset voltage by its source and drain terminals (e.g., in the embodiment shown in FIG. 6A, in which the switch 612 includes a PMOS transistor, a source terminal of the PMOS transistor may be connected to the source 614 of the reset voltage and a drain terminal of the PMOS transistor may be connected to the reset line 610). The gate of the MOS transistor may receive an ALS isolation control signal (ISO_ALS). The same source 614 may be alternately coupled to different reset lines coupled to different subsets of pixels (e.g., different rows of pixels, different colors of pixels, or other subsets of pixels) within the image sensor 600, via different switches; or different sources of reset voltages may be coupled to different reset lines by different switches.

The type of MOS transistor used for the switch 612 may depend on the type of transistors used in the reset circuits $608_1, \ldots, 608_n$ or the MOS design used for the image sensor 600 as a whole. In some embodiments, in which the reset circuits $608_1, \ldots, 608_n$ include NMOS transistors, a switching transistor used in the switch 612 maybe either a PMOS transistor or, alternatively, an NMOS transistor having a gate voltage that is boosted above the reset voltage provided by the reset line 610. In other embodiments, in which the reset circuits $608_1, \ldots, 608_n$ include PMOS transistors, the switching transistor may be a PMOS transistor having a gate voltage boosted below the reset voltage provided by the reset line 610. The switch 612 may include an enhancement mode (positive threshold voltage ($V_{TH}$)) transistor or, alternatively, a depletion mode (or negative $V_{TH}$) transistor.

In some embodiments, a control circuit (and in some cases a control circuit that is operated by a processor, which processor is executing a program that is stored in memory) may be coupled to the pixels $602_1, \ldots, 602_n$ and the switch 612 and determine when the various gate signals provided to the transistors of the image sensor 600 are asserted and de-asserted. The control circuit may be configured to operate the image sensor 600 in various modes of operation. For example, in a first mode, typically after a charge is integrated by each of the pixels $602_1, \ldots, 602_n$ and before the pixels $602_1, \ldots, 602_n$ are reset, the control circuit may turn off the switch 612 to electrically isolate the reset line 610 from the source 614 of the reset voltage, and then turn on the reset transistors of the reset circuits $608_1, \ldots, 608_n$ to electrically couple the sense nodes $604_1, \ldots, 604_n$ of the pixels $602_1, \ldots, 602_n$ to the reset line 610. This enables charge redistribution among the sense nodes $604_1, \ldots, 604_n$ of the pixels $602_1, \ldots, 602_n$, resulting in each of the sense nodes $604_1, \ldots, 604_n$ having the same value (i.e., same average voltage). In a second mode, following the first mode and before the pixels $602_1, \ldots, 602_n$ are reset, the control circuit may turn off the reset transistors of the reset circuits $608_1, \ldots, 608_n$ to electrically isolate the sense nodes $604_1, \ldots, 604_n$ from the reset line 610. Contemporaneously, the control circuit may turn off the switch 612 to electrically isolate the reset circuits $608_1, \ldots, 608_n$ from the reset line 610. Subsequently, a voltage corresponding to the redistributed charge may be read out from any one of the pixels $602_1, \ldots, 602_n$, as a voltage value representing an ambient light condition. In a third mode, subsequent to the second mode, the control circuit may turn on the switch 612 and the reset transistors of the reset circuits $608_1, \ldots, 608_n$, to supply the reset voltage to the sense nodes $604_1, \ldots, 604_n$ of the pixels $602_1, \ldots, 602_n$ through the reset line 610 and the reset transistors of the reset circuits $608_1, \ldots, 608_n$. The third mode may occur after reading out a charge integrated by each of the pixels $602_1, \ldots, 602_n$, and after reading out a redistributed charge from one of the pixels $602_1, \ldots, 602_n$.

The switch 612 and control circuit operation described with reference to FIG. 6A can be used to introduce an ALS phase into the timeline described with reference to FIG. 3B or 4B, which enables ambient light sensing after reading out a set of integrated charges from a set of pixels $602_1, \ldots, 602_n$. During the ALS phase, all of the sense nodes in a set of pixels $602_1, \ldots, 602_n$ are transitioned to a same voltage $V_{SN\_ALS}$ as a result of charge redistribution. This means that any one of the pixels $602_1, \ldots, 602_n$ may be used to determine an ALS value, which in turns means that only a single column of pixels in an image sensor needs to be read if charge is redistributed within each row of pixels in the image sensor. Thus, compared to conventional image capture using a CMOS image sensor, the ALS method described herein consumes significantly less power and can be performed faster than an image (or full image) capture. The analog voltage value read out from a sense node of a pixel, after charge redistribution, may be converted, using an analog-to-digital converter (ADC), to a digital value that correlates with a quantifiable ambient light condition. The digital resolution of the readout can be increased by increasing the number of ADCs in each row of an image sensor and averaging the readouts. The ambient light condition determined from an image frame may be used to determine and/or adjust an exposure time for a next (or subsequent) image frame by, for example, using an auto-exposure algorithm.

Although the reset line 610 may be associated with a parasitic capacitance 616, the parasitic capacitance 616 may be engineered small enough that it does not introduce significant error into the charge rebalance between the sense nodes $604_1, \ldots, 604_n$. In some embodiments, the parasitic capacitance 616 may introduce a linear systematic error into the charge rebalance, and consequently into the voltage corresponding to the charge rebalance (which voltage is read out of a pixel), and the linear systematic error may be calibrated out.

Figure 6B:
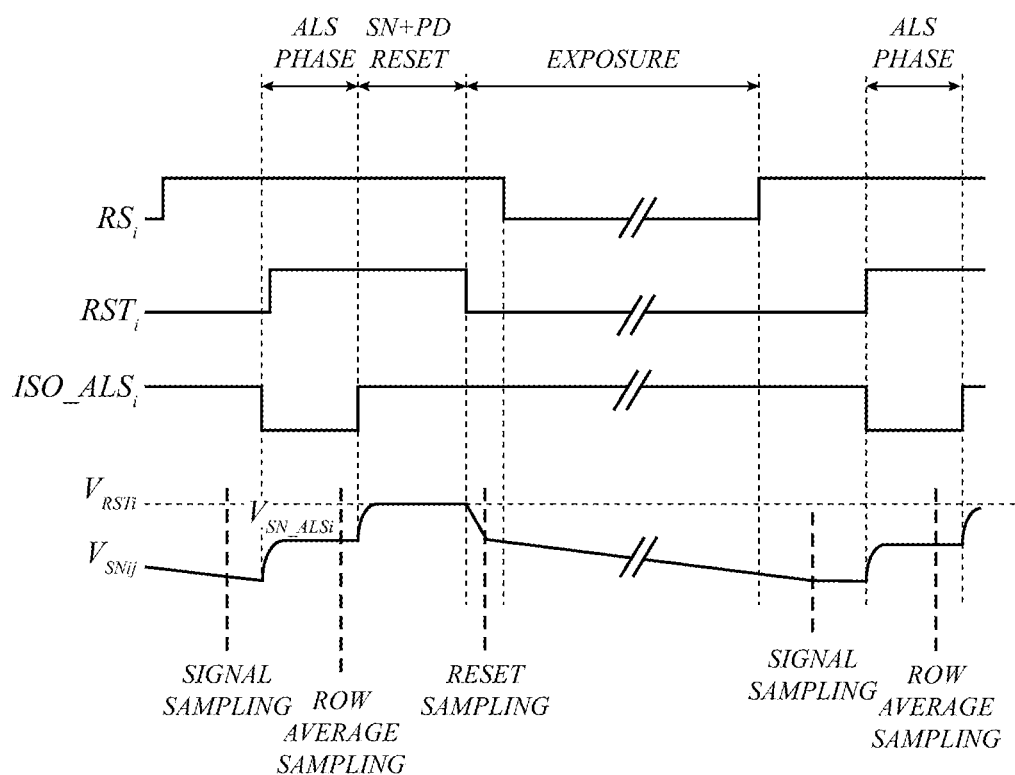
FIGS. 6B and 6C show timing diagrams for operation of a three-transistor pixel and a four-transistor pixel, respectively, according to certain aspects of the present disclosure.
Figure 6C:
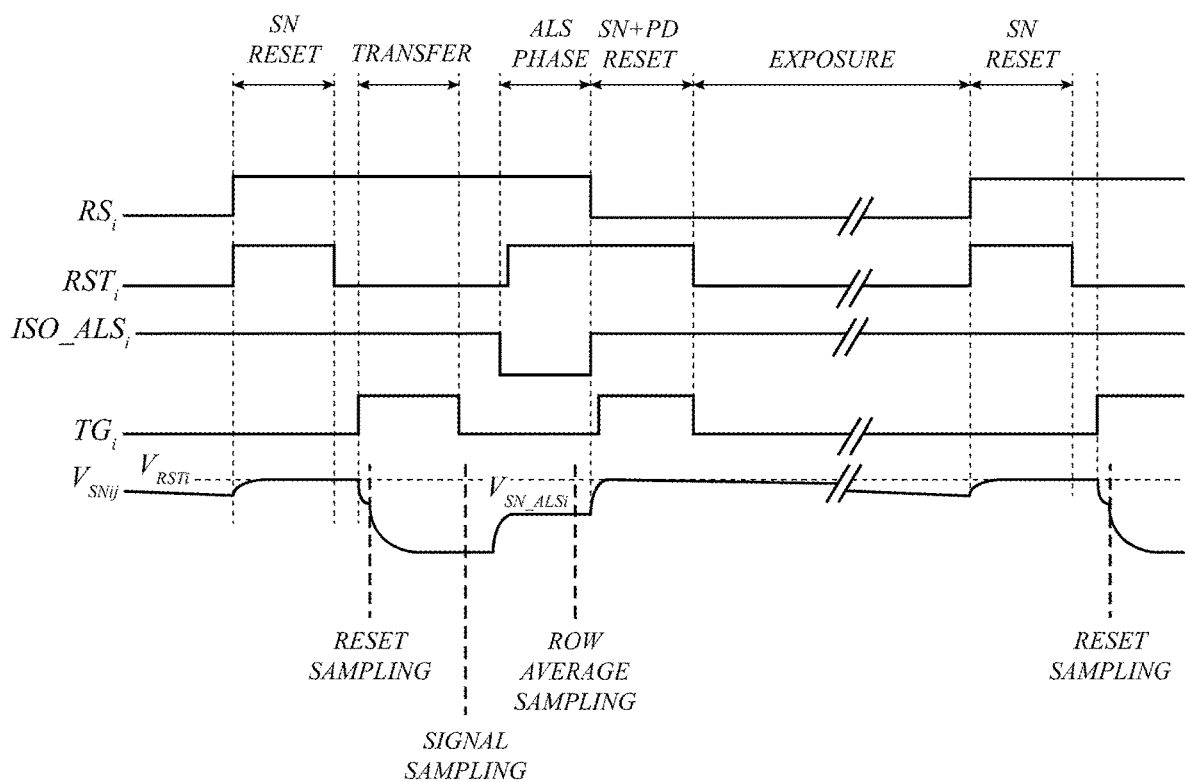

FIGS. 6B-6C show timing diagrams for operation of a three-transistor pixel, such as the pixel 300 described with reference to FIG. 3A (sec, FIG. 6B), or a four-transistor pixel, such as the pixel 400 described with reference to FIG. 4A (see, FIG. 6C) when a set of such pixels are coupled to a reset line with switch as described in FIG. 6A. In FIG. 6B, the "ALS" phase is introduced after the second part of the DDS Readout phase and before the "SN+PD Reset" phase (both described with respect to FIG. 3B). During the "ALS" phase, the ISO_ALS signal may be temporarily de-asserted, and then the RST signal may be asserted while the RS signal remains asserted and the ISO_ALS signal remains de-asserted. In FIG. 6C, the "ALS" phase is introduced after the second part of the CDS Readout phase and before the "SN+PD Reset" phase (both described with respect to FIG. 4B). During the "ALS" phase, the ISO_ALS signal may be temporarily de-asserted, and then the RST signal may be asserted while the RS signal remains asserted and the ISO_ALS signal remains de-asserted.

After redistributing charge between the sense nodes of a set of pixels, a voltage $V_{SN\_ALS}$ appears at the sense node of each pixel involved in the charge redistribution. The voltage $V_{SN\_ALS}$ may be read out of a single pixel in the set of pixels (e.g., at Row Average Sampling). A different but similarly generated voltage $V_{SN\_ALS}$ may also be read out of a single pixel in each of one or more other sets of pixels. For example, a voltage $V_{SN\_ALS}$ may be read out of multiple rows of pixels (or each row of pixels) in an image sensor having multiple rows of pixels (e.g., a voltage $V_{SN\_ALS}$ may be read from multiple pixels or each pixel in a particular column of pixels). The ALS voltages (e.g., $V_{SN\_ALS}$) for each row may then be averaged to determine an ALS value for the image sensor as a whole. In some embodiments, an image sensor may include multiple reset lines, with each reset line being electrically coupled to the reset circuits of a different set of pixels. In these embodiments, each reset line may be associated with, for example, one of: a row of pixels, a particular color of pixels, or a particular color of pixels within a particular row of pixels.

Figure 7:
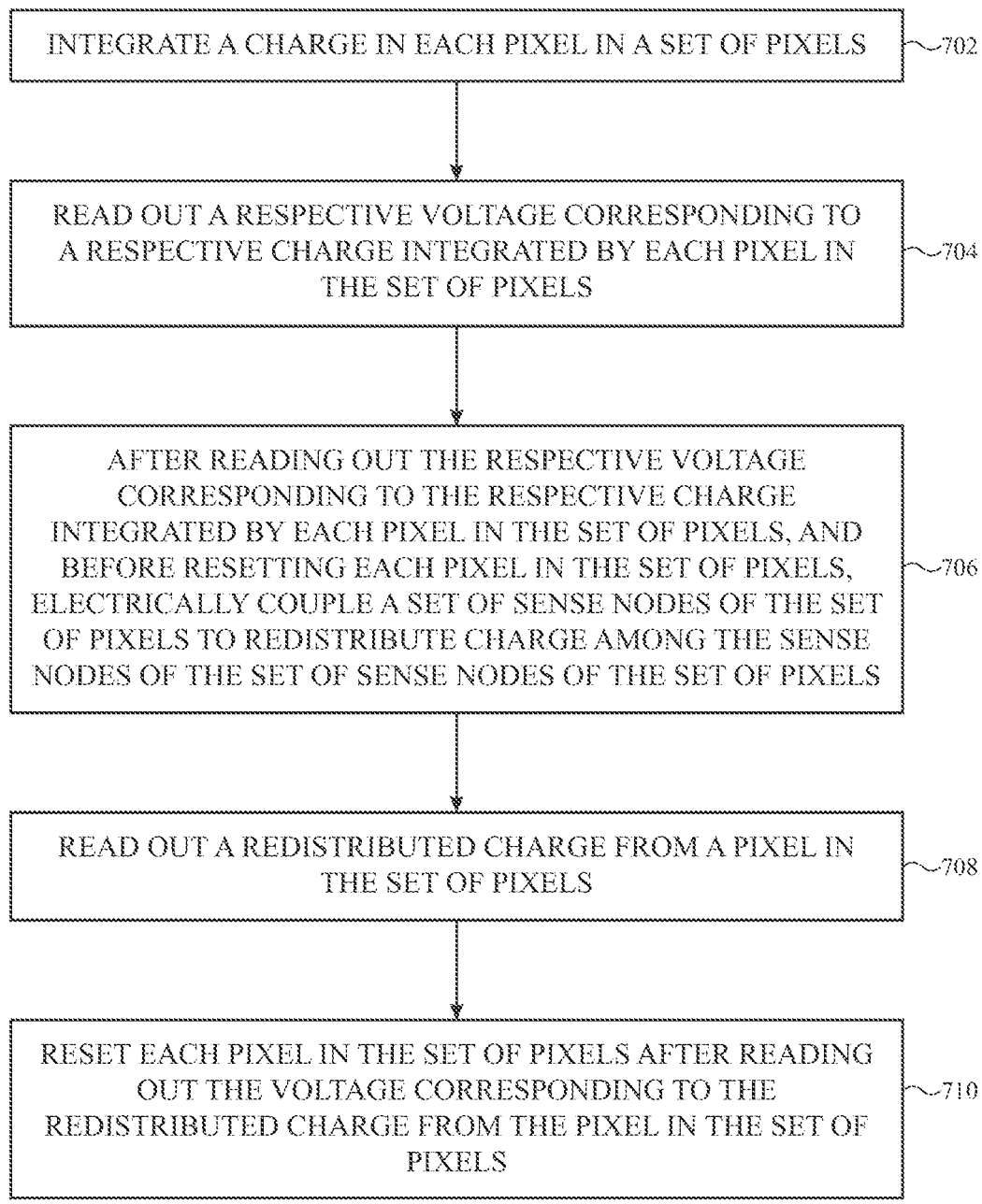
FIG. 7 shows an example method of measuring ambient light using an image sensor, according to certain aspects of the present disclosure.

FIG. 7 shows an example method 700 of measuring ambient light using an image sensor (e.g., the image sensor 600 described with reference to FIG. 6A). The method 700 may be implemented using any of the pixel architectures, image sensors, and/or associated control circuits described herein. Alternatively, the method 700 may be implemented using any pixel architecture, image sensor, and/or control circuits designed to incorporate the structures and/or techniques described herein.

At block 702, a charge may be integrated in each pixel in a set of pixels. This operation may be performed using a set of photodetectors of the set of pixels, in combination with supporting circuitry, as described, for example, herein.

At block 704, and for each pixel in the set of pixels, a respective voltage corresponding to the charge integrated by the pixel may be read out (i.e., read out of the pixels and/or read out of an image sensor including the pixels). This operation may be performed using the readout circuits of the set of pixels, as described, for example, herein.

At block 706, after reading out the respective voltage corresponding to the respective charge integrated by each pixel in the set of pixels, and before resetting each pixel in the set of pixels, the sense nodes of the set of pixels may be electrically coupled to redistribute charge among the sense nodes of the set of sense nodes of the set of pixels. In some embodiments, the sense nodes of the set of pixels may be electrically coupled through a reset line that may be electrically coupled to the reset circuits of the set of pixels. Prior to coupling the sense nodes to the reset line and redistributing charge among the sense nodes, the reset line may be electrically isolated from a source of a reset voltage.

At block 708, a voltage corresponding to a redistributed charge may be read out from a pixel in the set of pixels. This operation may be performed using the readout circuit of the pixel, as described, for example, herein.

At block 710, after reading out the voltage corresponding to the redistributed charge at block 708, each pixel in the set of pixels may be reset. This operation may be performed using the reset circuits of the set of pixels, as described, for example, herein.

In some embodiments of the method 700, an ambient light condition may be determined for an image frame, based at least in part on a voltage (or voltages) corresponding to a redistributed charge (or a set of redistributed charges) read out from one or more of the pixels in the set of pixels. In some embodiments, a voltage corresponding to a redistributed charge may be read out of an image sensor for each of a number of different sets of pixels (e.g., multiple or all rows of pixels), and the redistributed charges may be averaged to determine an ambient light condition. In some embodiments, a voltage corresponding to a redistributed charge may be read out for each row of pixels (e.g., by reading a redistributed charge from each pixel in a particular column of pixels). In some embodiments, an ambient light condition for a current image frame may be determined and used to determine (e.g., set or adjust) an exposure time for a subsequent image frame (e.g., the next image frame). In the same or other embodiments, an ambient light condition for a current image frame may be determined and used to determine (e.g., set or adjust) a brightness of a display adjacent to the image sensor.

In some embodiments, the method 700 may be used to detect the frequency of flickering light (e.g., a flicker frequency of artificial light). Artificial light sources may produce an illumination that varies, periodically, with a frequency of the rectified power grid. For example, LED light may flicker with a frequency of 100/120 Hz to a few kHz. The variation in light intensity caused by flicker may impact the quality of an image captured by an image sensor. For example, in a rolling shutter image sensor, the read-out circuitry is time-shared by reading the pixel array on a row-by-row basis at a fixed time interval (a line time). As a consequence, flicker can cause different rows to integrate light under different levels of ambient light intensity, causing shading or band artifacts in a captured image. In order to detect a flicker frequency, the frame rate of an image sensor should satisfy the Nyquist sampling criteria, such that the frame rate is greater than two times the flicker frequency. If the image sensor is operated in ALS mode with a reduced number of rows (and in some cases, rows that are equally distributed across the array to provide a better estimation of an average flicker), the image sensor may be operated at a higher frame rate and the Nyquist sampling criteria can be met (e.g., because voltages corresponding to redistributed charges do not need to be read out of as many rows and the period of an image frame may be reduced). For each image frame in a set of image frames, the illumination level may be determined by averaging the voltages corresponding to redistributed charges read out of a reduced number of pixels of a reduced number of rows. The minimum detectable flicker frequency may depend on the number of rows and exposure time used for a given readout noise. The detected flicker frequency, detected by comparing or trending an illumination value over a set of image frames, can be used to set the exposure time of the image sensor to a multiple of the flicker frequency, such that each row of pixels integrates light under the same set of ambient light conditions. If the flicker detection mode uses a reduced number of rows, it may be incompatible with the normal full frame image capture functionality of an image sensor. In these scenarios, the flicker detection configuration may need to be time multiplexed with a normal image capture configuration. In systems featuring multiple image sensors, one of the image sensors may be operated in an ALS mode, while another image sensor may be used to capture an image.

In some embodiments, the method 700 may be used to determine, for each image frame, whether a sufficient illumination level is reaching the image sensor, which can, in turn, be used to determine the optimal time interval for performing an image capture. This is particularly relevant when both the time for the "Exposure" phase and the "Transfer" phase occur during a time interval in which no light is emitted, causing the captured image to be dark (or completely dark) even in conditions in which the average illumination is not zero.

Figure 8:
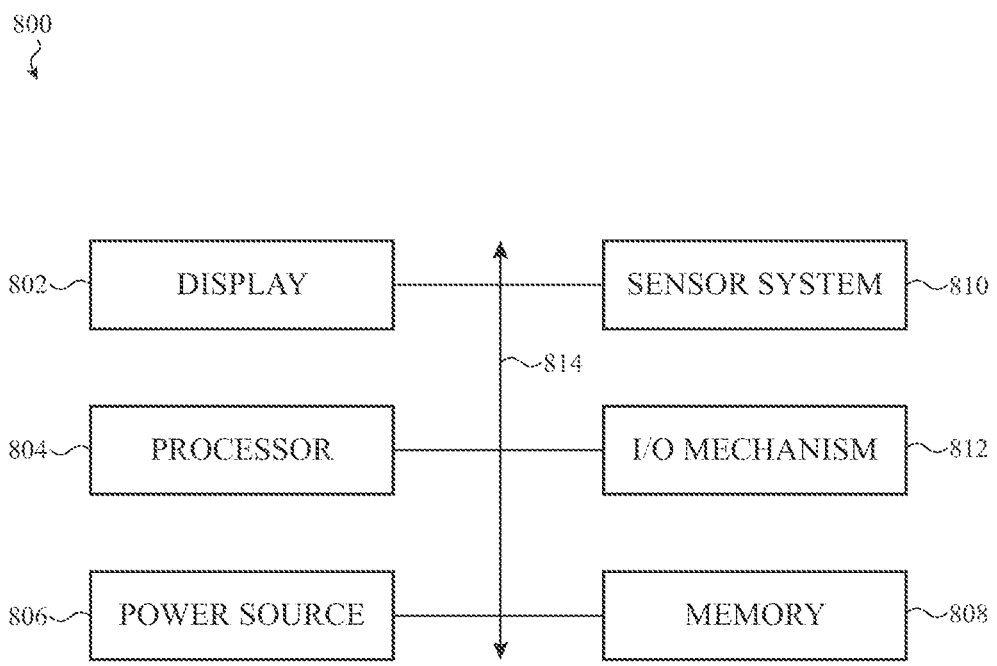
FIG. 8 shows an example electrical block diagram of an electronic device having an image sensor, according to certain aspects of the present disclosure.

FIG. 8 shows an example electrical block diagram of an electronic device 800 having an image sensor, such as an image sensor described with reference to any of FIGS. 1A-7. The electronic device 800 may take forms such as a handheld or portable device (e.g., a smartphone, tablet computer, or electronic watch), a navigation system of a vehicle, and so on. The electronic device 800 may include an optional display 802 (e.g., a light-emitting display), a processor 804, a power source 806, a memory 808 or storage device, a sensor system 810, and an optional input/output (I/O) mechanism 812 (e.g., an input/output device and/or input/output port). The processor 804 may control some or all of the operations of the electronic device 800. The processor 804 may communicate, either directly or indirectly, with substantially all of the components of the electronic device 800. For example, a system bus or other communication mechanism 814 may provide communication between the processor 804, the power source 806, the memory 808, the sensor system 810, and/or the input/output mechanism 812.

The processor 804 may be implemented as any electronic device capable of processing, receiving, or transmitting data or instructions. For example, the processor 804 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 800 may be controlled by multiple processors. For example, select components of the electronic device 800 may be controlled by a first processor and other components of the electronic device 800 may be controlled by a second processor, where the first and second processors may or may not be in communication with each other.

The power source 806 may be implemented with any device capable of providing energy to the electronic device 800. For example, the power source 806 may include one or more disposable or rechargeable batteries. Additionally, or alternatively, the power source 806 may include a power connector, power cord, or power receiver that connects the electronic device 800 to another power source, such as a wall outlet or wireless charger.

The memory 808 may store electronic data that may be used by the electronic device 800. For example, the memory 808 may store electrical data or content such as, for example, audio and video files, documents and applications, device settings and user preferences, timing signals, control signals, data structures or databases, image data, maps, or focus settings. The memory 808 may be configured as any type of memory. By way of example only, the memory 808 may be implemented as random access memory, read-only memory, Flash memory, removable memory, other types of storage elements, or combinations of such devices.

The electronic device 800 may also include one or more sensors defining the sensor system 810. The sensors may be positioned substantially anywhere on the electronic device 800. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 810 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology.

The I/O mechanism 812 may transmit and/or receive data from a user or another electronic device. An I/O device may include a display, a touch sensing input surface such as a track pad, one or more buttons (e.g., a graphical user interface "home" button, or one of the buttons described herein), one or more cameras (including one or more image sensors), one or more microphones or speakers, one or more ports such as a microphone port, and/or a keyboard. Additionally, or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 812 may also provide feedback (e.g., a haptic output) to a user.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

What is claimed is:

1. An image sensor, comprising:
   a reset line;
   a set of pixels including a first pixel and a second pixel, each of the first pixel and the second pixel separately comprising:
   a sense node;
   a photodetector electrically coupled to the sense node;
   a readout circuit electrically coupled to the sense node; and
   a reset transistor operable to couple or decouple the sense node to the reset line; and
   a switch operable to couple or decouple the reset line to a source of a reset voltage; and
   a control circuit configured to:
   after reading out respective voltages corresponding to respective charges integrated by the first pixel and the second pixel, and before resetting the first pixel and the second pixel,
   operate the switch to electrically decouple the reset line from the source of the reset voltage;
   operate the respective reset transistors of the first pixel and the second pixel to electrically couple the respective sense nodes of the first pixel and the second pixel via the reset line;
   operate the respective reset transistors of the first pixel and the second pixel to electrically isolate the respective sense node from the reset line; and
   read out, from the first pixel or the second pixel, a voltage corresponding to a redistributed charge.

2. The image sensor of claim 1, wherein the switch comprises a metal oxide semiconductor (MOS) transistor coupled between the reset line and the source of the reset voltage by a respective source terminal and a drain terminal of the MOS transistor.

3. The image sensor of claim 2, wherein the reset transistor is a n-type metal oxide semiconductor (NMOS) transistor, and the switch comprises a p-type metal oxide semiconductor (PMOS) transistor.

4. The image sensor of claim 2, wherein the reset transistor is a first n-type metal oxide semiconductor (NMOS) transistor, and the switch comprises a second NMOS transistor having a gate voltage boosted above the reset voltage.

5. The image sensor of claim 2, wherein the reset transistor is a first p-type metal oxide semiconductor (PMOS) transistor, and the switch comprises a second PMOS transistor having a gate voltage boosted below the reset voltage.

6. The image sensor of claim 1, wherein each of the first pixel and the second pixel comprise:
   a charge-transfer transistor electrically coupling the photodetector to the sense node, the charge-transfer transistor operable to transfer charge integrated by the photodetector to the sense node.

7. The image sensor of claim 1, wherein:
   the voltage is a first voltage;
   the set of pixels is arranged in a set of rows;
   the first pixel and the second pixel are in a first row of the set of rows; and
   the control circuit is configured to,
   read a second voltage corresponding to a second redistributed charge from a pixel in a second row of the set of rows; and
   average at least the first voltage and the second voltage.

8. The image sensor of claim 7, wherein:
   the set of pixels is arranged in a set of columns; and
   the first pixel in the first row and the pixel in the second row are in a same column of the set of columns.

9. The image sensor of claim 8, wherein the control circuit is configured to average at least the first voltage and the second voltage with a respective voltage read from a respective pixel in each row in the set of rows.

10. The image sensor of claim 8, wherein the control circuit is configured to average at least the first voltage and the second voltage with a respective voltage read from a respective pixel in fewer rows than each row in the set of rows.

11. The image sensor of claim 7, wherein:
   the control circuit is configured to, after reading out respective voltages corresponding to respective charges integrated by each pixel in the first row, operate a respective reset transistor of each pixel in the first row to redistribute charge among the sense nodes of the pixels in the first row.

12. The image sensor of claim 1, further comprising:
a set of reset lines including the reset line; wherein,
the reset line is coupled to a set of reset transistors of pixels associated with a same color.

13. An image sensor, comprising:
a set of pixels including a first pixel and a second pixel, each of the first pixel and the second pixel separately comprising:
a sense node;
a charge integration circuit electrically coupled to the sense node;
a readout circuit electrically coupled to the sense node; and
a reset circuit electrically coupled to the sense node; and
a control circuit coupled to the reset circuits of the first pixel and the second pixel and operable to:
in a first mode, after reading out respective voltages corresponding to respective charges integrated by the first pixel and the second pixel, and before resetting the first pixel and the second pixel, electrically isolate a reset line from a source of a reset voltage and then electrically couple the sense nodes of the first pixel and the second pixel to the reset line through the reset circuits of the first pixel and the second pixel;
in a second mode, electrically isolate the sense nodes of the first pixel and the second pixel from the reset line, the electrical isolation provided at least in part by the reset circuits of the first pixel and the second pixel;
in the second mode, read out, from the first pixel or the second pixel, a voltage corresponding to a redistributed charge; and
in a third mode, supply the reset voltage to the sense nodes of the first pixel and the second pixel, the reset voltage supplied by the source of the reset voltage, through the reset line and the reset circuits of the first pixel and the second pixel.

14. The image sensor of claim 13, wherein the control circuit includes a metal oxide semiconductor (MOS) transistor coupled between the reset line and the source of the reset voltage by a respective source terminal and a drain terminal of the MOS transistor.

15. A method of measuring ambient light using an image sensor, comprising:
integrating a charge in each pixel in a set of pixels;
reading out a respective voltage corresponding to a respective charge integrated by each pixel in the set of pixels;
after reading out the respective voltage corresponding to the respective charge integrated by each pixel in the set of pixels, and before resetting each pixel in the set of pixels, electrically coupling a set of sense nodes of the set of pixels to redistribute charge among the sense nodes of the set of sense nodes of the set of pixels;
reading out a voltage corresponding to a redistributed charge from a pixel in the set of pixels; and
resetting each pixel in the set of pixels after reading out the voltage corresponding to the redistributed charge from the pixel in the set of pixels.

16. The method of claim 15, further comprising determining an ambient light condition for an image frame based at least in part on of the voltage corresponding to the redistributed charge read out from the pixel in the set of pixels.

17. The method of claim 16, further comprising determining an exposure time for a subsequent image frame based at least in part on the ambient light condition.

18. The method of claim 16, further comprising determining a brightness of a display adjacent to the image sensor based at least in part on the ambient light condition.

19. The method of claim 15, further comprising:
performing operations to redistribute the charge for each image frame of a set of image frames;
reading a set of voltages corresponding to a set of redistributed charges from the pixel for the set of image frames; and
determining a flicker frequency in ambient light based at least in part on the set of voltages.

* * * * *